United States Patent
Alston et al.

(10) Patent No.: US 10,233,261 B1
(45) Date of Patent: Mar. 19, 2019

(54) NATURAL POLYMER NANOPARTICLES FROM IONIC LIQUID EMULSIONS

(71) Applicant: The United States of America as represented by the Secretary of the Air Force, Washington, DC (US)

(72) Inventors: Jeffrey Alston, Valencia, CA (US); Joseph Mabry, Lancaster, CA (US); Andrew Guenthner, Lancaster, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 15/672,365

(22) Filed: Aug. 9, 2017

Related U.S. Application Data

(60) Provisional application No. 62/377,108, filed on Aug. 19, 2016.

(51) Int. Cl.
 *A61K 8/64* (2006.01)
 *C08B 16/00* (2006.01)

(52) U.S. Cl.
 CPC .................................. *C08B 16/00* (2013.01)

(58) Field of Classification Search
 CPC .. A61K 8/64; A61K 9/06; A61K 47/42; A61L 27/227
 USPC ................................ 424/489, 497; 514/18.8
 See application file for complete search history.

(56) References Cited

U.S. PATENT DOCUMENTS

| | | | |
|---|---|---|---|
| 2,076,594 | A | 4/1937 | Richter |
| 2,542,984 | A | 2/1951 | Binkley |
| 2,993,794 | A | 7/1961 | Moshy |
| 3,034,852 | A | 5/1962 | Nishihara |
| 3,892,731 | A | 7/1975 | Austin |
| 6,427,933 | B1 | 8/2002 | Tsubouchi |
| 2003/0157351 | A1 | 8/2003 | Swatloski |
| 2007/0231398 | A1* | 10/2007 | Van Lare ............ A61K 9/1688 424/490 |
| 2012/0055793 | A1 | 3/2012 | Bryning |
| 2013/0316892 | A1* | 11/2013 | Nakamura ............ B01J 20/285 502/7 |

FOREIGN PATENT DOCUMENTS

CN 105641746 * 6/2016

OTHER PUBLICATIONS

Charreau, H., Nanocellulose Patents Trends: A Comprehensive Review on Patents on Cellulose Nanocrystals, Microfibrillated and Bacterial Cellulose, Recent Patents on Nanotechnology, 2013, vol. 7, No. 1.
Meng, Z., Dissolution of natural polymers in ionic liquids: A review, e-Polymers 2012, No. 028.
Suzuki, T., Preparation of cellulose particles using an ionic liquid, Journal of Colloid and Interface Science 418 (2014) 126-131.

* cited by examiner

*Primary Examiner* — Yih-Horng Shiao
(74) *Attorney, Agent, or Firm* — AFMCLC/JAZ; Timothy Barlow

(57) ABSTRACT

A method of making natural polymer (nano)particles, comprises two immiscible phases and a surface active agent, wherein one phase includes a natural polymer source and ionic liquid; stirring the combined phases with surfactant to form a microemulsion; adjusting the ratios of ionic liquid, surfactant, and immiscible phase to determine a particular size of natural polymer nanoparticles; stirring antisolvent into the emulsion; diluting the emulsion; and washing and drying precipitated polymer (nano)particles from the emulsion. The immiscible phase comprises at least one of immiscible solvent, oil, or immiscible ionic liquid. The ionic liquid phase includes natural polymer dissolved in ionic solvent. The antisolvent is water, other protic solvent or additive. The emulsion is diluted with, more immiscible phase, 1-butanol, or a mutually miscible solvent, or oil. The emulsion is diluted with an excess of the volume of the emulsion. The precipitated polymer (nano)particles are washed (sequentially) with 1-butanol and water.

10 Claims, 18 Drawing Sheets

NATURAL POLYMER NANOPARTICLES FROM IONIC LIQUID EMULSIONS

Pursuant to 37 C.F.R. § 1.78(a)(4), this application claims the benefit of and priority to prior filed Provisional Application Ser. No. 62/377,108, filed 19 Aug. 2016, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to the production of nanoparticles of natural polymers and, more particularly, to the production of natural polymer nanoparticles from ionic liquid emulsions.

BACKGROUND OF THE INVENTION

In nature there are a number of abundant natural fibers, i.e. cellulose, keratin, fibroin, chitin, collagen, etc. that are of use to many industries and for many applications but historically have been difficult to work with due to their insolubility in water and many common organic solvents. This natural insolubility, mainly due to strong inter- and intra-molecular bonding, has restricted the solvation and processing of these natural fibers to crude and/or chemically harsh and environmentally unfriendly methods. Current and common processing methods are capable of manipulating the natural polymers to form fibers, threads, films/gels, papers, and can in some cases digest the polymer to liberate naturally occurring nanoscale (elements having at least one dimension in the 1-100 nm range, and more broadly, under 1000 nm)-sized structures from the source material. However, due to the uncontrolled methods in which nanoscale sized particles of these natural fibers are currently produced, their ultimate utility is limited.

Several technologies have been developed to dissolve cellulose and the previously-mentioned natural fibers. Nanoparticles of cellulose have been produced in one of three ways: rod-like cellulose nanoparticles have been extracted from plants by acid hydrolysis (nanocrystals), by mechanical treatment leading to microfibrillated cellulose (MFC), and microbially-produced nanofibrils (bacterial cellulose, BC). The cellulose solvation-based processing methods discussed above are effectively the state of the art for the production of nanoscale natural polymer particles. These methods have a major commonality in that they utilize different pathways to break down natural polymers into smaller and smaller pieces until at least one dimension fulfills the definition of nanoscale. With regard to cellulose and the scope of patented cellulose nanoparticle processing, it is important to note that at no point do these processes direct or control the ultimate size and morphology (shape) of the polymer particles.

Like cellulose, keratin, silk fibroin, chitin, collagen, and any similarly-structured natural polymers are challenging to work with due to solubility issues. Previous work in this field teaches that cellulose, keratin, silk fibroin, chitin, and collagen can be processed using strong bases or acids. However, these methods are harsh and often derivatize the polymer. The most well-known method is the processing of cellulose to form cellulose xanthate solutions, typically used for the production of viscose-Rayon. Keratin has also been dissolved in dialkyl sulfoxides like dimethyl sulfoxide. All of these previously used methods of solvation degrade and derivatize the natural polymers, or use environmentally unsafe or exotic organic solvents. It is desired to have a means for dissolving cellulose and other natural fibers without severe degradation or derivatization.

SUMMARY OF THE INVENTION

The present invention overcomes the foregoing problems and other shortcomings, drawbacks, and challenges of producing particles, including nanoparticles, from natural polymers. While the invention will be described in connection with certain embodiments, it will be understood that the invention is not limited to these embodiments. To the contrary, this invention includes all alternatives, modifications, and equivalents as may be included within the spirit and scope of the present invention.

It was conceived that cellulose can be dissolved by ionic liquids, and it was later shown that ionic liquids are a means to dissolve all the aforementioned natural fibers without severe degradation or derivatization. The ability to easily dissolve natural fibers with ionic liquids has opened many avenues of discovery for the manipulation of these materials. One such avenue is the directed control of natural polymer nanoparticle size and shape. We now have solvent options, e.g. ionic liquids (ILs), which do not destroy the natural polymer chains or derivatize their chemical functionality. Natural polymer nanoparticles can serve as useful "renewable/green" fillers in composite structures, as durable coatings and textures, or even scaffolds for low density structures and devices. However these endeavors will be limited without precise control over the particles shape and size. There remains, therefore, the need to be able to control the size and shape of cellulose and other natural polymer particles. This invention provides a means to easily process renewable and abundant natural polymers, as well as controlling the shape and size of the resultant particles for applications not limited to those mention above. The particles produced by this process can also be used in addition to or as replacement for reinforcing fillers in composite structures, a substitute for toxic or expensive engineered polymers, or as durable, textured coatings on sensitive materials.

According to one embodiment of the present invention, a method of making natural polymer (nano)particles, comprises: a) combining a polar phase with a nonpolar phase, wherein the polar phase includes a natural polymer source and an ionic liquid; b) stirring the combined polar and nonpolar phases with a nonionic surfactant to form a microemulsion; c) adjusting the ratios of ionic liquid, surfactant and oil to determine a particular size of natural polymer nanoparticle; d) stirring an antisolvent into the microemulsion; e) diluting the microemulsion; and f) washing and drying precipitated polymer (nano)particles from the diluted microemulsion. The method is advantageous in that it does not derivatize the natural polymer, and the precipitate comprises nanoparticles of the natural polymer.

According to another embodiment of the invention, the nonpolar phase comprises at least one of hexadecane and oil. Numerous types of oil and other solvents may be selected in order to achieve the desired particle size. Any liquid immiscible with the ionic liquid phase will work, i.e. a liquid that is nonpolar enough, or with different enough properties from the selected ionic liquid to be immiscible. However, because it is a dynamic system, any change of one phase will require a different surfactant formulation.

According to a further embodiment, the polar phase includes a natural polymer dissolved in an ionic solvent. The natural polymer may include cellulose, keratin, chitin, collagen and silk fibroin, as well as numerous others having similar molecular bonds and structures. The particular ionic solvent may be selected in order to achieve the desired natural fiber particle size.

According to another embodiment of the invention, the nonionic surfactant is at least one of SPAN20®, SPAN80®, and TWEEN 20®. Numerous other surfactants may be selected for use alone or in combination in order to achieve the desired natural fiber particle size. There are a great number of surfactants that are acceptable for use in this process. A consideration in the selection of a surfactant is the surfactant's ability to adjust interfacial tension between the two immiscible phases, while avoiding any antisolvent interactions with the natural polymer in the IL. The surfactant cannot possess any overly-strong hydrogen bonding character or polar character that could disrupt the cellulose IL interaction. In general, nonionic surfactants may be best for this use, but some ionic surfactants and poly-ethoxy-based surfactants are also acceptable. A blend of several surfactants may be needed to control the shape of the resultant nanoparticles (NPs).

According to a further embodiment, the antisolvent is water. Protic character is the primary antisolvent mechanism. However desolvation of the polymer particles may be achieved by excessive dilution with another miscible solvent as well.

According to another embodiment of the invention, the microemulsion is diluted with 1-butanol. 1-butanol is presented as an example of an acceptable antisolvent. In this case 1-butanol is a much more mild antisolvent compared to water, and 1-butanol has the benefit of being miscible with the nonpolar phase and the ionic liquid (IL), which essentially dilutes the emulsion while simultaneously beginning aggregation of the particles.

According to a further embodiment, the microemulsion is diluted with an excess volume of the antisolvent, e.g. 1-butanol. A very large dilution helps limit the coalescence of the cellulose-IL domains during the aggregation process. The optimal dilution will depend on the particular reagents selected, but a dilution of between 2× and 20×, e.g. 10×, approaches a practical limit for dilution, at least with regard to the scale for a benchtop process.

According to another embodiment of the invention, the precipitated polymer (nano)particles are washed (sequentially) with 1-butanol and water. The amounts of 1-butanol and water are variable, depending on the amount of ionic liquid desired to be removed. The amount of ionic liquid to be removed is also application dependent, i.e. it may not be desirable to remove all of the ionic liquid, e.g. leaving residual IL in the particle during recovery will affect the electrical properties of the resultant particle, determining whether or not the particle is electrically conductive.

The natural polymer nanoparticles made according to the claimed method have numerous applications.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The present invention discloses a method for making and/or recovering natural fiber (natural polymer) particles ranging between 0.1 nm to 1000 nm diameter where ultimate shape and size of the natural fiber particles is controlled by the disclosed method. Emulsions and microemulsions (μE) of natural polymers dissolved in ionic liquids are formed according to the disclosed method in order to produce nanoparticles of the natural polymers. Size and morphology of the nanoparticles is controlled by selecting and tailoring the specific components of the emulsion to affect the size and shape of the emulsion domains. By isolating the natural polymer ionic liquid solutions into dispersed nanometer scale pools (domains) in a continuous phase, the size and morphology of the natural polymer particle is controlled. Methods of emulsion preparation, treatment, particle collection, and characterization are described below in accordance with various embodiments of the invention.

The following examples illustrate particular properties and advantages of some of the embodiments of the present invention. Furthermore, these are examples of reduction to practice of the present invention and confirmation that the principles described in the present invention are therefore valid, but they should not be construed as in any way limiting the scope of the invention.

Ionic liquid (IL) emulsions are possible using an appropriate combination of phases, i.e. continuous phase, surfactant, dispersing phase. In addition, natural polymers can be dissolved in ionic liquids. The present invention is a novel concept that demonstrates the use of two unrelated methods to ultimately dissolve natural polymers in ionic liquids followed by the formation of ionic liquid emulsions to produce nanoscale (0.1 nm to 1000 nm) ionic liquid-natural polymer domains. From these domains, nanoparticles of natural fiber (natural polymer) sources can be produced, in which the ultimate size and shape of the particles may be precisely controlled.

Figure 1:
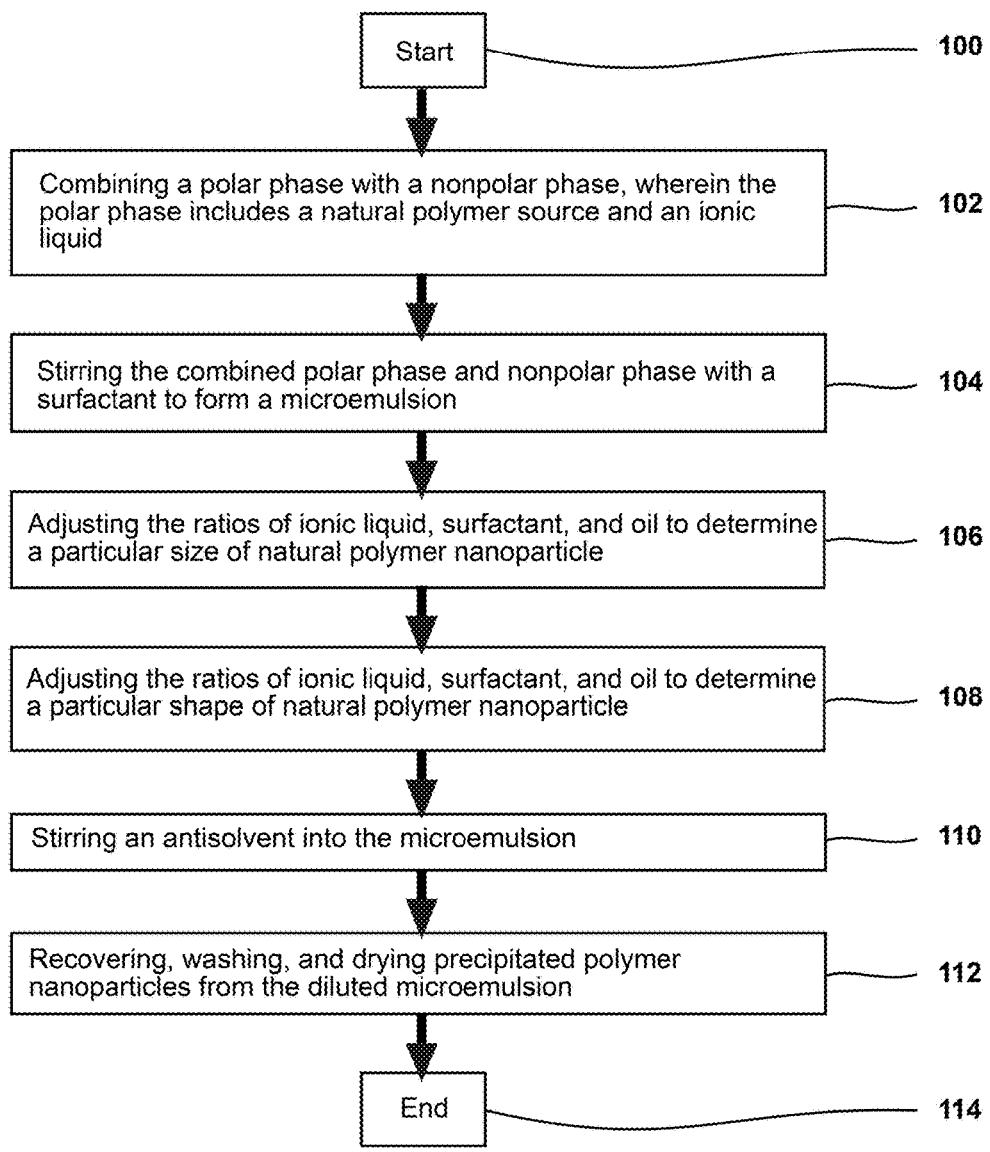
FIG. 1 depicts a general synthetic process for the creation of natural polymer nanoparticles via ionic liquid emulsion, according to an embodiment of the invention.

A general process scheme for making cellulose nanoparticles, a representative natural polymer, is depicted in FIG. 1. Emulsions and microemulsions of natural polymers dissolved in ionic liquids can be used to produce nanoparticles of the natural polymers. Advantageously, the claimed method permits one to control the size and morphology of the resulting natural polymer particles. No known method combines the use of Ionic Liquid solubility of natural polymer fibers with a controlled emulsion system to produce natural polymer nanoparticles.

The method for making natural polymer nanoparticles starts (step 100) by combining a polar phase with a nonpolar phase, wherein the polar phase includes a natural polymer source and an ionic liquid (step 102). A solution of the natural polymer, cellulose in Example 1, below, is made by dissolving cellulose, e.g. microcrystalline cellulose, in an ionic liquid (IL), e.g. BmimOAc, with or without a cosolvent. The natural polymer and IL form a polar phase to which a non-polar oil phase may be added. In most cases a cosolvent would be used when the viscosity of the natural polymer-IL solution restricts effective processing, i.e. mixing of the solution for full dissolution, mixing of the polymer-IL solution with surfactant or nonpolar phase. If the viscosity of the polymer-IL solution is significantly higher than the other phases it will be difficult to mix the phases to form an emulsion. In some cases it is feasible that a cosolvent could increase the solubility limit of the natural polymer in the ionic liquid solutions so that a higher weigh percentage of the natural polymer could be added to the solution. This would be another parameter that would affect the ultimate properties of the recovered particles.

The natural fiber-IL solution, this is a polar phase, is dispersed in an immiscible continuous phase (aqueous or non-aqueous), such as by stirring, to form an emulsion or microemulsion with nanoscale domains. The term 'emulsion' is intended to encompass microemulsions, which are a specific class of emulsions that are thermodynamically stable. This is a distinction from nanoemulsions, which are also a sub-class of emulsions but are not thermodynamically stable. The term 'emulsion' is intended to cover all these cases. The examples provided herein pertain to microemulsions.

Next, the combined polar phase and nonpolar phase are stirred with a surfactant to form a microemulsion (step 104). An oil, e.g. hexadecane or other non-polar phase, is mixed with the immiscible continuous (polar) phase. The mixture from step 102 is stirred vigorously (step 104), and a surfactant, e.g. SPAN 80™, is added to it create a microemulsion of ionic liquid (IL) and oil.

Regarding cosolvents, the cosolvent in most cases would be used when the viscosity of the natural polymer-IL solution restricts effective processing, i.e., mixing of the solution for full dissolution, or mixing of the polymer-IL solution with surfactant or nonpolar phase. If the viscosity of the polymer-IL solution is significantly higher than the other phases it will be difficult to mix the phases to form an emulsion. In some cases a cosolvent may be used to increase the solubility limit of the natural polymer in the ionic liquid solutions so that a higher weight percentage of polymer could be added to the solution. This would be another parameter that would affect the ultimate properties of the recovered particles.

An antisolvent may be a protic solvent, or a soluble solid that has hydrogen bonding constituents, i.e. water, mineral acids or bases, halide salts, alcohols, or protic solvents such as acetone. Additionally, a cross-linking agent may be used as a pseudo antisolvent, which would act in much the same way, by crosslinking the dissolved polymer creating a solid precipitated mass.

Next, (step 106) the ratios of ionic liquid, surfactant, and oil are adjusted to determine a particular size of natural polymer nanoparticles, and (step 108) the ratios of ionic liquid, surfactant, and oil are adjusted to determine a particular shape of natural polymer nanoparticles. Examples of ratios corresponding to particular shapes are presented in FIGS. 3-4.

Next, (step 110) an antisolvent, e.g. water or any additive that interrupts the favorable interaction of the ionic liquid and the hydrogen bonding sites of the natural polymer, is added to the microemulsion in order to precipitate the natural polymer nanoparticles. The mixture is diluted, for example, into 1-butanol (about 10× the volume of the μE, i.e. an excess of dilutent relative to the microemulsion volume). The diluted solution is stirred for a short period (5 min-2 days) to facilitate congealing, crosslinking, or precipitation of the particles from the ionic liquid domains. Finally, (step 112) the particles are recovered, washed, and dried, ending the process (step 114). The particles may be collected and removed from solution, such as by filtration, centrifugation, or magnetic field or electric field extraction. The size and shape of the emulsion domains from step 104 serve to direct the size and shape of the nanoparticles which form during the regeneration step, i.e. anti-solvent addition, solvent removal, cross-linking, field generation, etc., corresponding to steps 110 and 112 above. The resulting particles can then be recovered and collected, as described above.

Washing is performed with an appropriate antisolvent (see also step 110) that can remove residual surfactant, ionic liquid, and nonpolar phase. There will always be trace amounts oil and ionic liquid, trapped inside or adhered to the surface of the particles. Washing will help remove that residual material. Washing may be performed with a solvent like 1-butanol that is slightly miscible with both the oil, e.g. hexadecane, and the ionic liquid and can be used to wash away both materials. Alternatively, water may be used, which will remove more ionic liquid than 1-butanol due to the higher solubility of IL in water. However, water will not remove any nonpolar materials.

Drying may encompass, but is not limited to, drying on the filter, heating, heating under vacuum, supercritical fluid extraction and drying, freeze-drying, and/or any process which aids in the extraction and removal or excess liquid/solvent from the recovered product.

The antisolvent of step 110 may be any additive that interrupts the favorable interaction of the ionic liquid and the hydrogen bonding sites of the natural polymer. The antisolvent may be a protic solvent or a soluble solid that has hydrogen bonding constituents, i.e. water, mineral acids or bases, halide salts, alcohols, or protic solvents such as acetone. Additionally, a cross-linking agent may be used as a pseudo antisolvent, which would act in much the same way, by crosslinking the dissolved polymer to create a solid precipitated mass.

Figure 2:
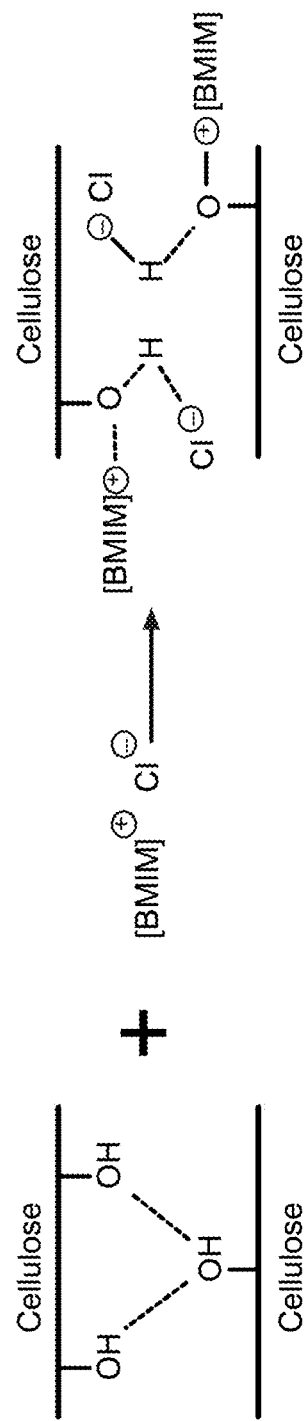
FIG. 2 the dissolution of cellulose.

Cellulose, like other natural polymer fibers, is intra- and inter-molecularly connected by hydrogen bonds, and is insoluble in water and most organic solvents. According to the prior art, multi-step processes and harsh solvents are necessary for dissolution of such molecules. Drastic conditions such as the viscose method, for example, are used for the prior art dissolution of cellulose. However, according to the disclosed method, ionic liquids (ILs) form electron donor-acceptor complexes with hydroxyl groups of cellulose resulting in separation and dissolution, as depicted in FIG. 2.

Natural polymer fibers are defined as naturally-occurring biologically-sourced polymers which naturally arrange into macromolecular fibrous structures that, because of their intra- and inter-molecular noncovalent bonding, makes them difficult to dissolve in common solvents. The natural polymer fibers subject to the disclosed method can be dissolved by ionic liquids due to ionic liquids' ability to disrupt those previously-mentioned bonds (see FIG. 2).

Numerous examples of natural fibers which are structurally similar to cellulose include wool keratin, silk fibroin, chitin, elastin, and collagen, each of which have hydrogen bonding that is able to be disrupted and dissolved by ionic liquids. Each of these natural fiber examples, and many others, may be processed into nanoparticles according to the disclosed method.

Microemulsions are transparent, isotropic, and thermodynamically stable colloidal dispersions of two immiscible liquids stabilized by surfactant(s). Microemulsions typically have droplet diameters of approximately 100 nm or less. These droplet diameters may be tuned to form cylindrical shapes or several bicontinuous structures. Bicontinuous structures can vary from irregular structures to ordered patterns, such as cubic patterned arrangements, hexagonal patterns, inverted hexagonal patterns, or lamellar structures.

The cellulose particle size and morphology may be precisely controlled by creating a true IL-Cellulose microemulsion, according to the disclosed methods. The morphology of cellulose dissolved in ionic liquids may be controlled via adjustment of the emulsification constituents and/or via the regeneration mechanism (steps 110 and 112 above). Cellulose is a linear polymer of cellobiose that consists of two glucose sugar units that are linked by glucosidic linkages (C—O—C) at the C1 and C4 positions. Cellulose also has strong intra- and inter-molecular hydrogen bonding which is the main contributor to its insolubility in most solvents. Cellulose is presented as a representative natural polymer for the purposes of demonstrating the effectiveness of the claimed method. However, other natural polymers having similar chemical structures and similar intermolecular bonds, e.g. wool keratin, silk fibroin, chitin, and collagen, inter alia, that make dissolution by traditional means challenging, may also be utilized according to the disclosed method.

Figure 3:
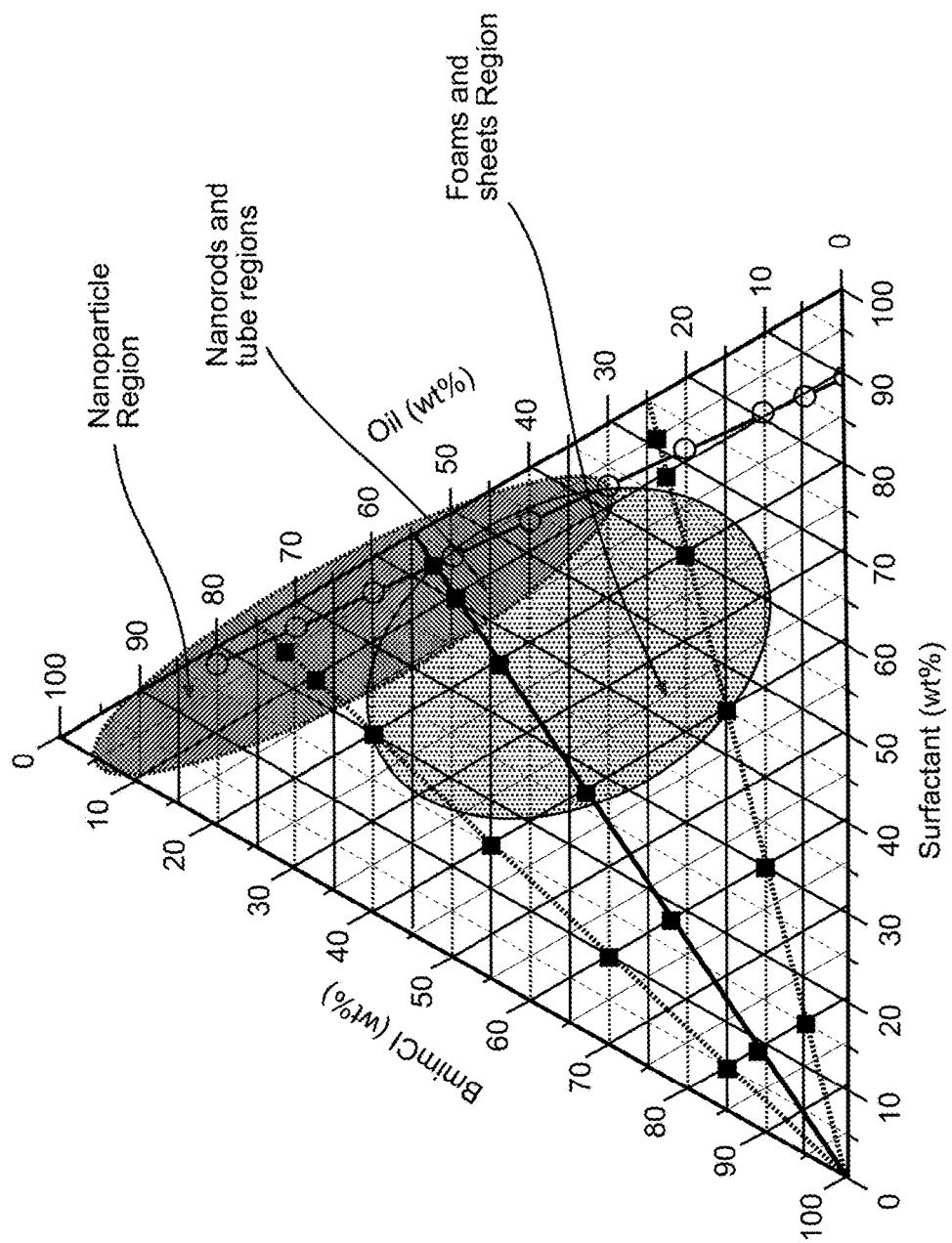
FIG. 3 illustrates a quasi-ternary phase diagram constructed with BmimCl/Span 80®/Tween 20®/Sunflower oil, according to an embodiment of the invention.

Variations on the method may include adjustments in the ternary composition of the emulsion, i.e. ratios of components, types and/or blends of surfactant, types of oil, and types of ionic liquid, as illustrated in the phase diagram of FIG. 3. Shape and size of the resultant natural fiber particles is established before recovery by targeting an area of the phase diagram for IL-natural fiber/surfactant/oil emulsion corresponding thereto. Visual observations and dynamic light scattering (DLS) may be used to identify shape regions in the emulsion. Regarding types of oil that are acceptable for use with the disclosed methods, any liquid immiscible with the ionic liquid phase will work, i.e. a liquid that is nonpolar enough, or with different enough properties from the selected ionic liquid to be immiscible. However, because it is a dynamic system, any change of one phase will require a different surfactant formulation.

Figure 4:
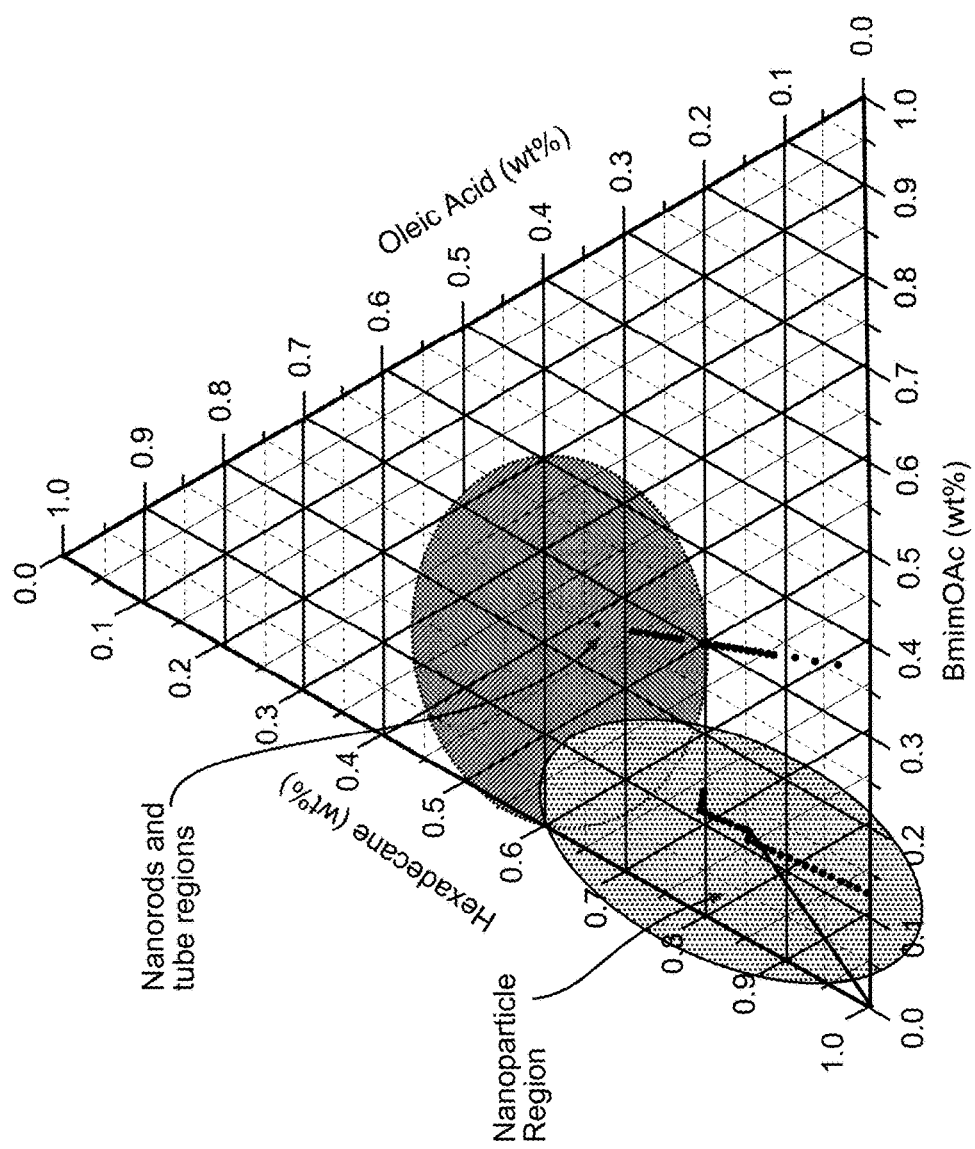
FIG. 4 illustrates a quasi-ternary phase diagram constructed with BmimCl/Oleic acid/hexadecane, according to an embodiment of the invention.
Figure 5:
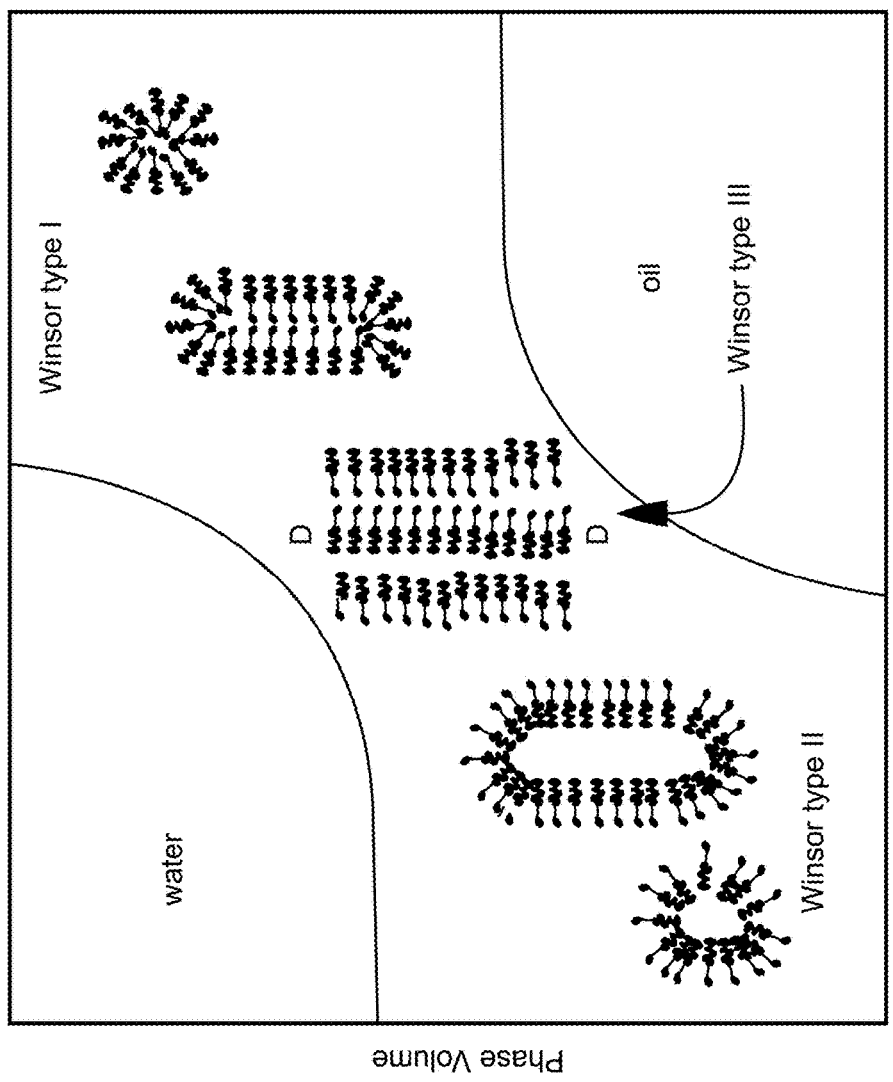
FIG. 5 illustrates the nanoparticle shapes associated with different areas of a phase diagram, according to an embodiment of the invention.
Figure 6:
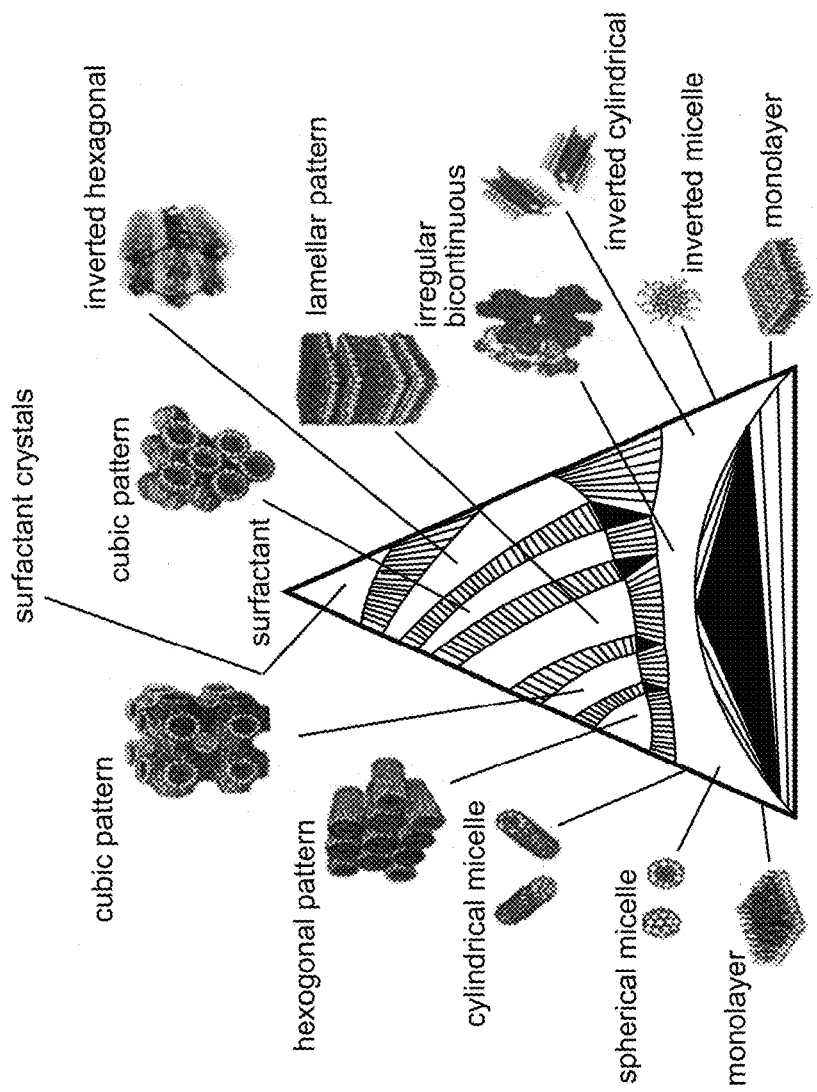
FIG. 6 illustrates exemplary surfactants suitable for producing natural polymer-containing microemulsions, according to an embodiment of the invention.
Figure 7:
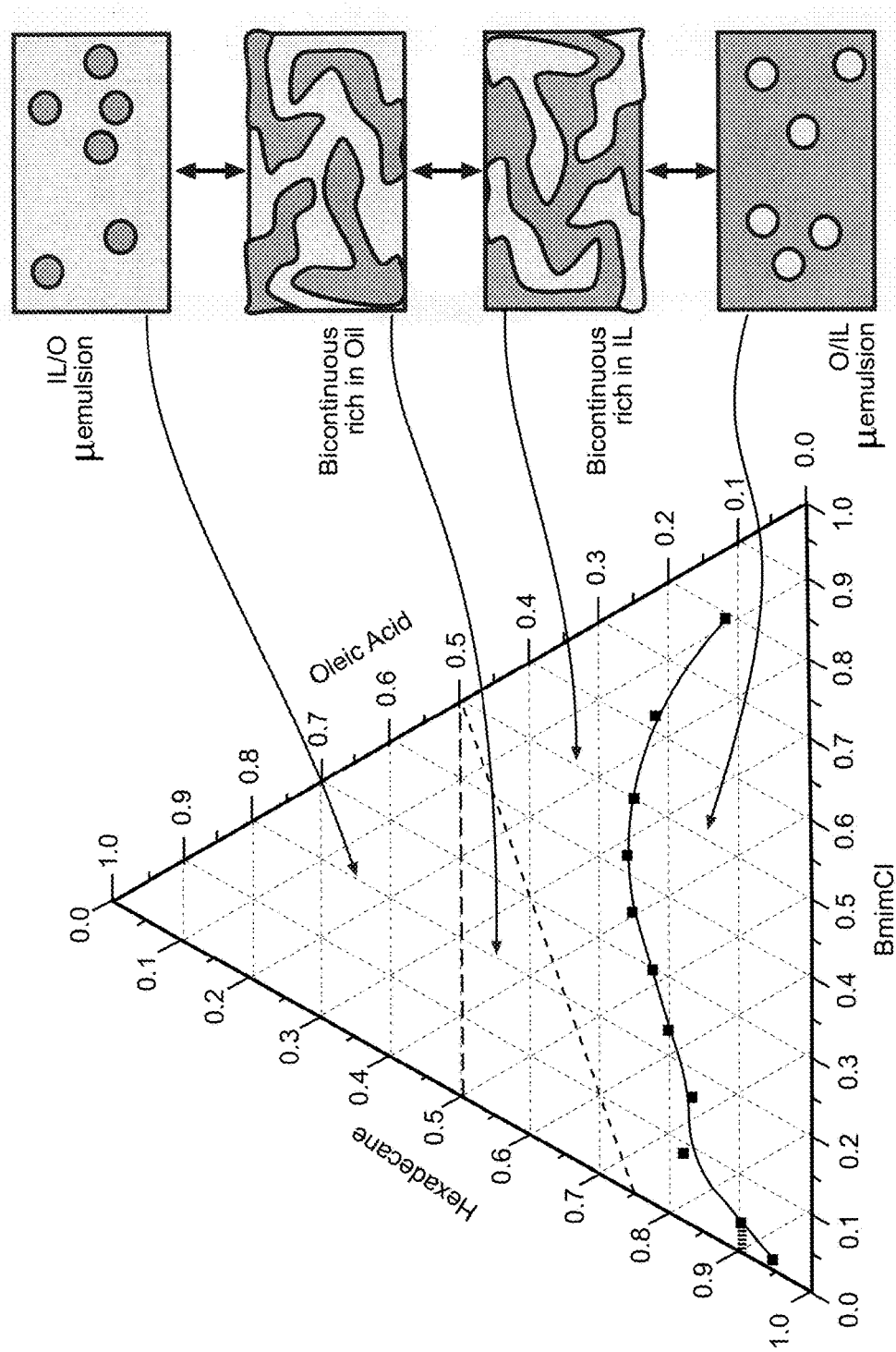
FIG. 7 illustrates exemplary surfactants suitable for producing natural polymer-containing microemulsions, according to an embodiment of the invention.
Figure 8:
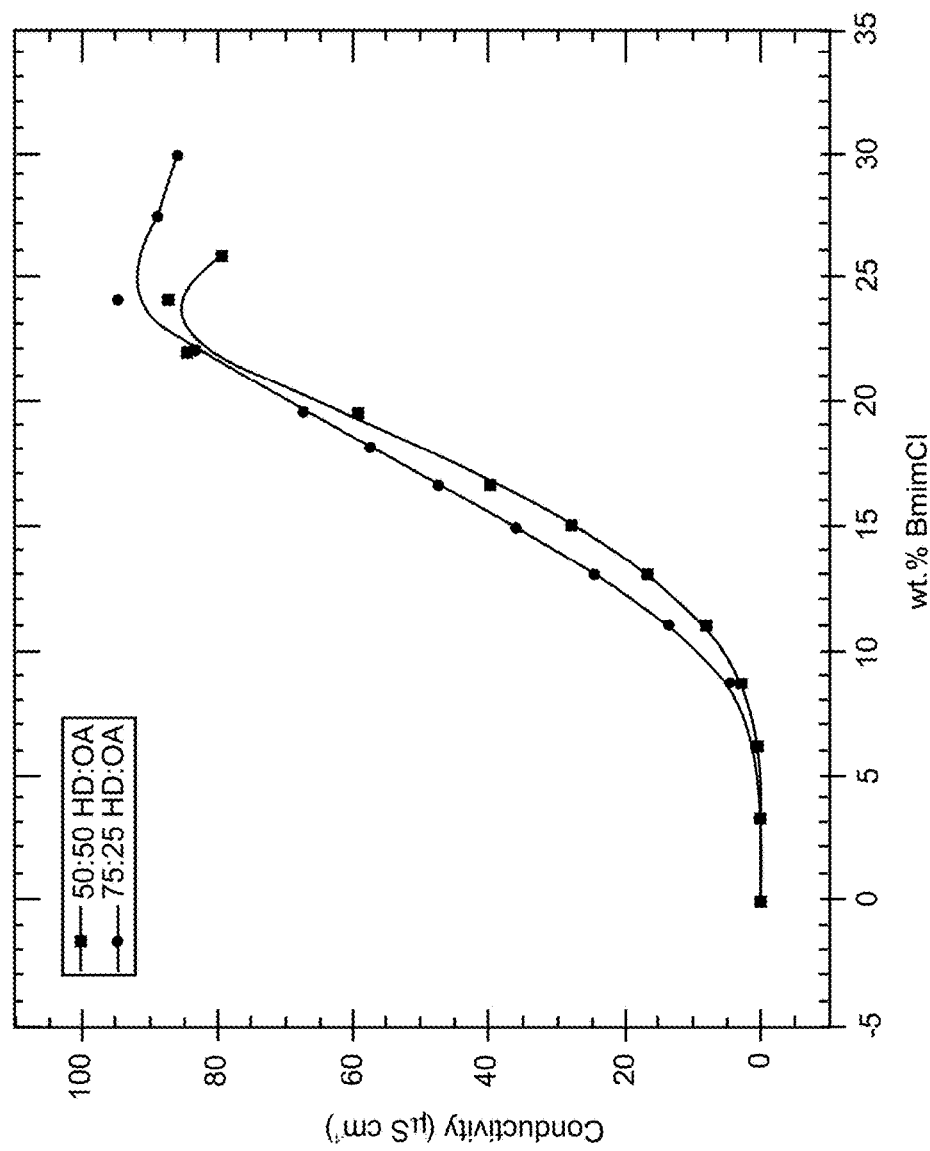
FIG. 8 illustrates exemplary ionic liquids suitable for solvation of natural fiber polymers and emulsion processes, according to an embodiment of the invention.
Figure 9:
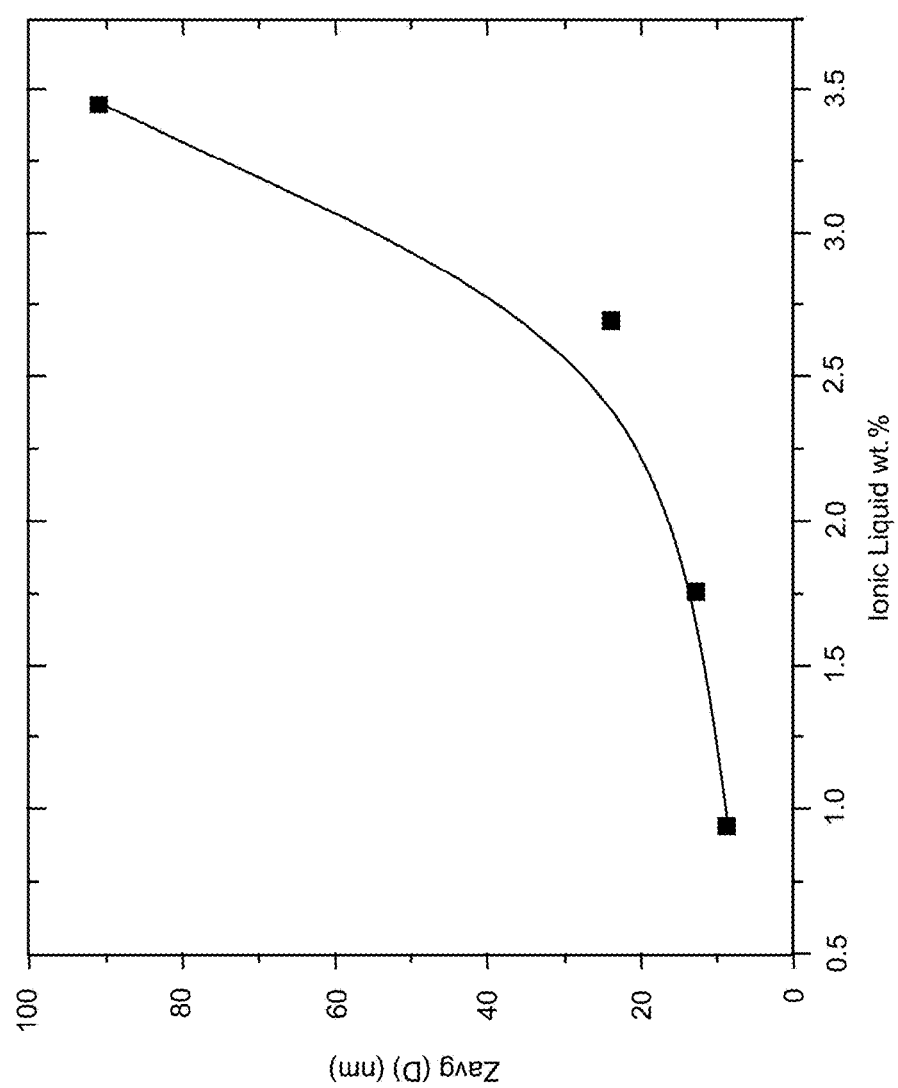
FIG. 9 illustrates dynamic light scattering of the microemulsion of FIG. 7 based on the ionic liquid content, according to an embodiment of the invention.

FIG. 4 illustrates a phase diagram for the particular combination of BmimOAc/hexadecane/Oleic acid, and FIG. 5 illustrates the classical types of emulsions (Winsor types I, II, III) and the range of desired shapes and sizes of the particles derived from the natural polymer fibers that may be achieved in a Winsor type III emulsion. It was found that the shape of cellulose and the natural fibers is directed by the morphology of an emulsion. The desired shape and size of the natural polymer fiber particles, e.g. nanoparticles, nanorods, nanotubes, foams, or sheets, is established before recovery by targeting an area of the phase diagram for the appropriate IL-cellulose/surfactant/oil emulsion combination. FIG. 6 is a generic representation of a ternary diagram showing possible shape conformation that can be achieved in a microemulsion system. These variations of morphology are the result of adjustments to the process which effect the micelle size and shape of the emulsion as well as the solubility of the polymer, and which ultimately determine the size and shape of the particles produced. FIGS. 7-9 illustrate various characteristics of a ternary diagram including hexadecane, oleic acid, and BmimCl. FIG. 7 illustrates the physical characteristics of the microemulsion in four exemplary zones of the ternary diagram. FIG. 8 illustrates the effects of BmimCl concentration on the conductivity of the microemulsion of FIG. 7. FIG. 9 illustrates dynamic light scattering of the microemulsion of FIG. 7 based on the ionic liquid content. Visual observations combined with dynamic light scattering (DLS) analysis, small angle x-ray diffraction and conductivity measurements may be used to identify shape regions and thereby identify the structure of the emulsion.

Additional variations of the disclosed methods may include preprocessing steps to digest the polymers, e.g. acid digestion followed by applied sonication energy, which chemically and physically cleaves the polymer molecule, reducing the average molecular weight, to target specific ranges of molecular weight, as well as the use of different recovery methods such as changing anti-solvents, freeze drying, and/or changes in applied temperature and pressure. These adjustments to the disclosed method may be used to influence and determine the physical properties of the natural polymer fiber particles produced, including the porosity/surface area of the particles, and the lower size limits of the particles produced by the method.

Figure 10:
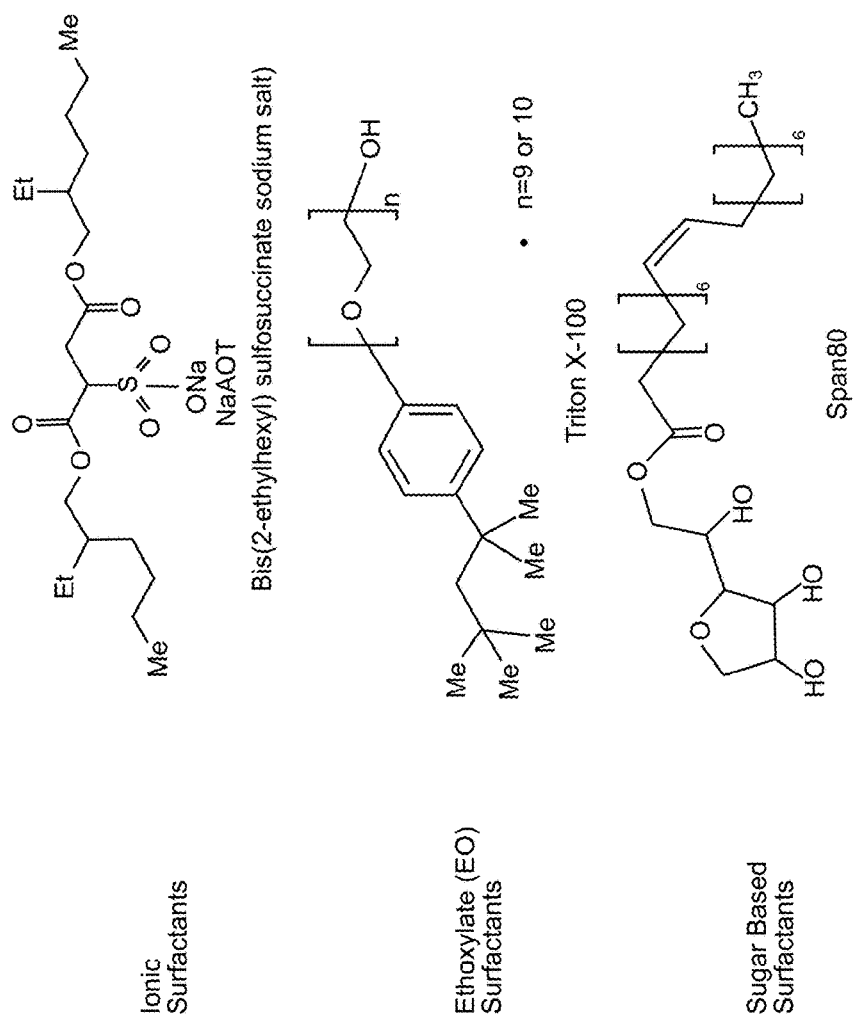
FIG. 10 illustrates a few of the various surfactants which are suitable for producing natural polymer-containing microemulsions, according to an embodiment of the invention.

FIG. 10 illustrates a few of the various surfactants which are suitable for producing natural polymer-containing microemulsions, including Bis(2-ethylhexyl) sulfosuccinate sodium salt (representing ionic surfactants), Triton X-100 (representing ethoxylate surfactants), and SPAN 80™ (representing sugar-based surfactants).

Figure 11:
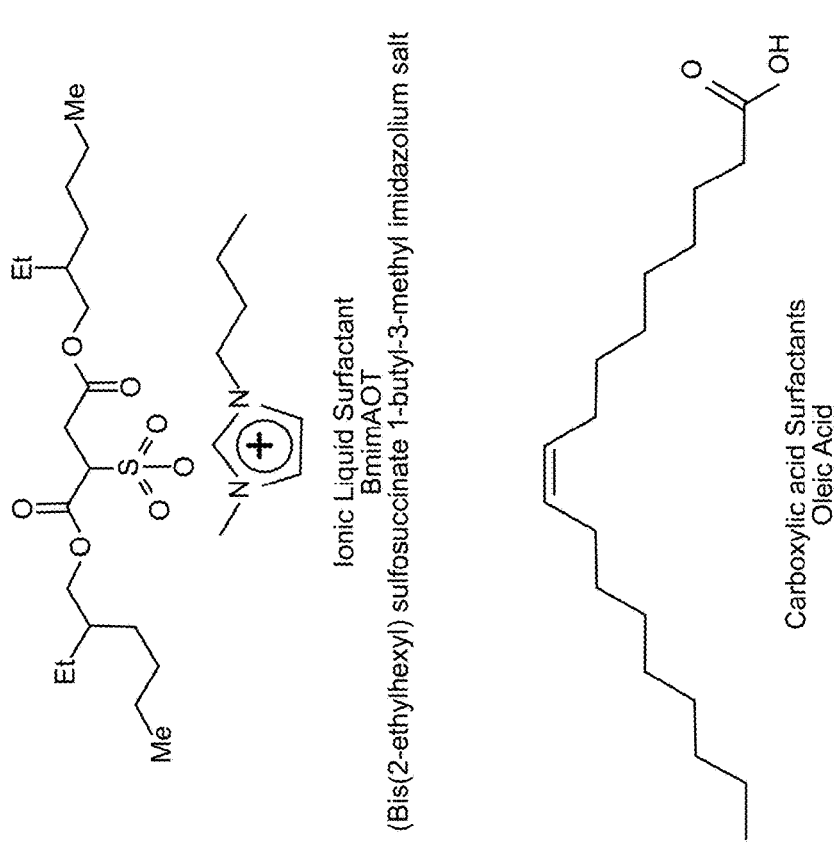
FIG. 11 illustrates two surfactants which have proven useful for cellulose-containing emulsions, according to an embodiment of the invention.

FIG. 11 illustrates two surfactants which have proven useful for cellulose-containing emulsions, including the ionic liquid surfactant BmimAOT (bis(2-methylhexyl) sulfosuccinate 1-butyl-3-methyl imidazolium salt), and the ionic liquid surfactant Oleic acid. These surfactants are effectively ionic surfactants, but they have some unique qualities that make them interesting. For example, BmimAOT is an ionic liquid surfactant with the same cation as the polymer solvent, so it is very compatible with and useful for shaping the emulsion. Oleic acid is mostly a nonpolar alkane with a slightly acidic ionic head, so it does not disrupt the solubility of the natural polymers even at high concentration. Any surfactant that does not disrupt the natural polymer solubility is acceptable for use with the disclosed methods. Those surfactants depicted in FIGS. 10-11 are representative of most of the common classes of surfactants, ionic, ethoxylate, and non-ionic. There are also other exotic types including zwitterionic surfactants, and polymer steric stabilizer surfactants, which are also acceptable for use with the disclosed methods.

Ionic Liquids for Natural Polymer Emulsions and Microemulsions

Figure 12:
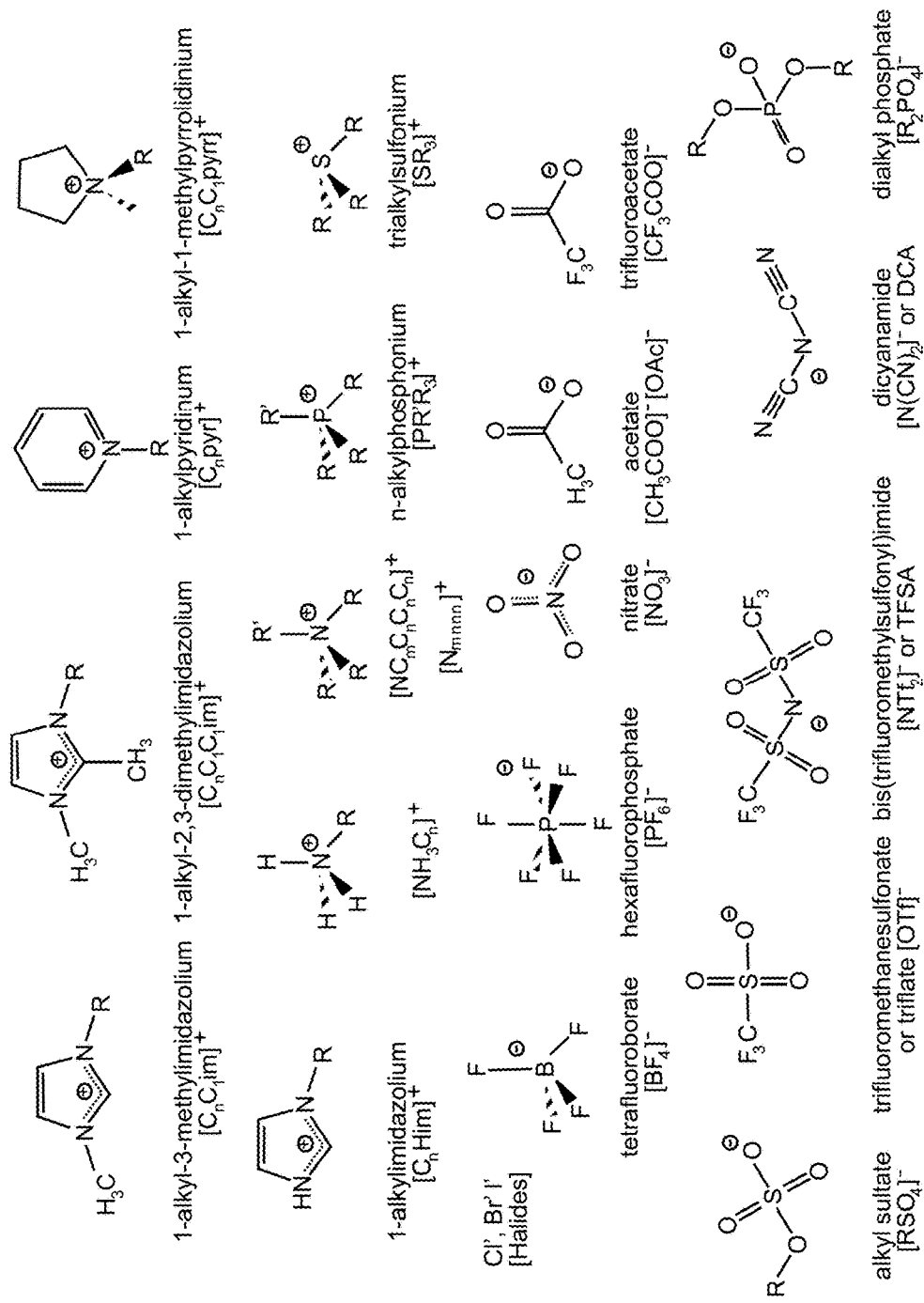
FIG. 12 depicts a non-limiting list of exemplary suitable ionic liquids, according to an embodiment of the invention.

As discussed above, ILs (a non-limiting list of exemplary suitable ionic liquids is presented on FIG. 12) can dissolve natural polymers and, according to the disclosed method, may be used to replace water and/or traditional organic solvents to prepare novel IL-based microemulsions. In IL-containing microemulsions, ILs transition from droplets to a bicontinuous structure that spans the single-phase microemulsion region. Different ILs have different melting points, and therefor different viscosities at room temperature. For example, 3-methyl-1-butyl imidazolium acetate has a melting point of about −20° C., but 3-methyl-1-butyl imidazolium chloride has a melting point of about 70° C. Both are good solvents for natural polymers but they have drastically different melting points and room temperature viscosities. ILs may be selected to reduce the viscosity of the emulsion at room temperature, which enables easier mixing and formation of the emulsion, which in turn allows easier adjustment of the emulsion mixture ratios and analysis of the system. Alternatively, increasing the viscosity of the non-polar oil phase would increase stability, due to limiting the diffusion and collisions of the IL domains.

As detailed herein, fabrication of natural polymer fiber particles having a desired shape and/or size may be effected by targeting specific emulsion constituent ratios, adding surfactant to the IL-polymer/oil mixture while stirring to form an emulsion, then adding antisolvent to recover nanoparticles.

Figures 13A, 13B, 13C:
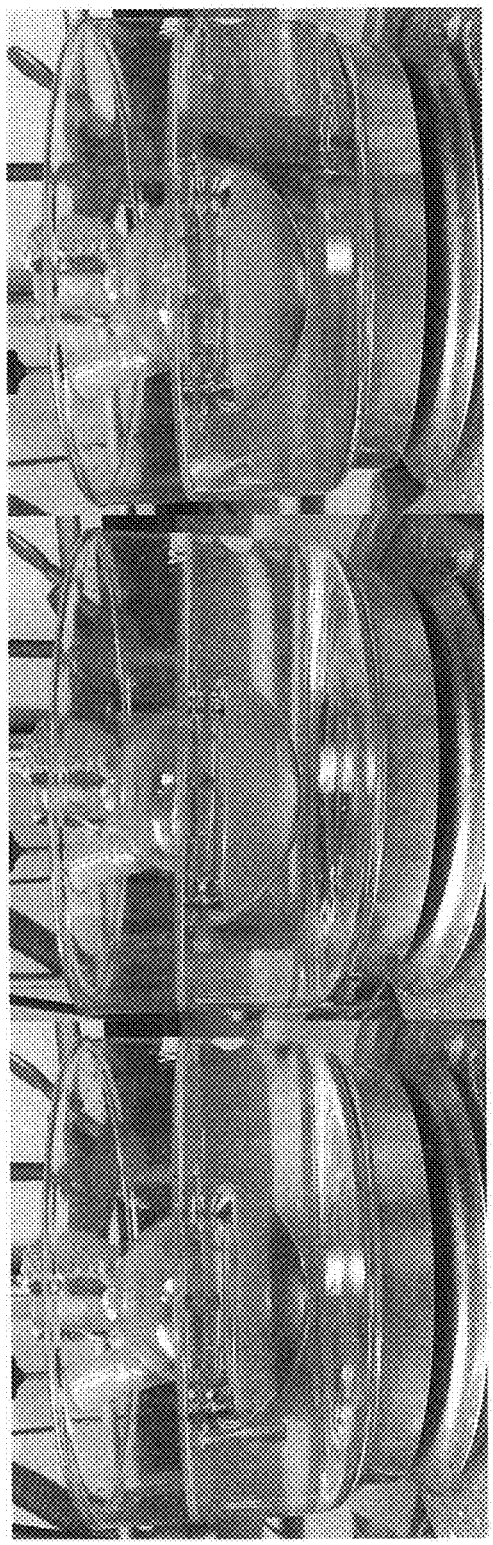
FIG. 13A depicts immiscible liquids in a container.
FIG. 13B illustrates the formation of an emulsion upon addition of a surfactant.
FIG. 13C illustrates particle recovery upon the addition of an anti-solvent, according to an embodiment of the invention.

FIGS. 13A-13C illustrate the method. FIG. 13A depicts immiscible liquids in a container: the top clear layer in this example is an oil, e.g. hexadecane, hexane, toluene, and/or liquid alkanes, and the bottom layer is an ionic liquid-polymer solution, e.g. cellulose in BmimOAc, wool in BmimCl, or silk in BmimCl.

FIG. 13B illustrates the formation of an emulsion upon addition of a surfactant, e.g. SPAN 20®, SPAN 80®, and TWEEN 20® to the solution of FIG. 13A.

FIG. 13C illustrates particle recovery upon the addition of an anti-solvent, e.g. water, methanol, ethanol, acetone, butanol, or similar, to the emulsion of FIG. 13B.

Table 1 below describes some evaluation techniques for emulsions and natural fiber particles (NPs).

TABLE 1

Evaluation Techniques for Emulsion and NPs

| Parameters Studied | Techniques Used |
| --- | --- |
| Phase Behaviour | Phase contrast microscopy and freeze fracture TEM |
| Size and Shape | Transmission Electron Microscopy (TEM), SEM, DLS |
| Rheology | Viscometer |
| Conductivity | Conductivity Meter |
| Zeta Potential | Zetasizer |
| pH | pH Meter |
| Drug Release Studies | Franz Diffusion Cells |
| Physical Stability Study | Ultracentrifuge |

Example 1

Microcrystalline cellulose (MCC) was purchased from Sigma Aldrich and dried under vacuum at 60° C. for 24 hrs. before use. 1-butyl-3-methylimidazolium acetate (BmimOAc) was purchased from Sigma Aldrich and kept dry under vacuum until use. Total water content of the dry BmimOAc as determined by Karl Fisher titration was <1% by weight. Hexadecane was also purchased from Sigma Aldrich and used as received. SPAN20 purchased from Sigma Aldrich was stored in a desiccator to limit the amount of moisture absorbed.

A stock solution of 5 wt % MCC in BmimOAc was made by adding 0.5 g MCC to 9.5 g BmimOAc while stirring at 60° C. for 12 h under nitrogen to limit moisture uptake in the ionic liquid and avoid the potential for oxidation. Temperature is adjusted to provide lower viscosities and higher solubilities, but care must be taken to avoid the thermal degradation of the natural fibers. Time is reliant on the dissolution rate. It takes longer for higher molecular weight natural fibers to dissolve. The goal is to form an isotropic transparent solution with a slight yellow to amber color, indication full dissolution. From the stock solution a 1 wt % MCC in BmimOAc solution was formed by diluting 1 g stock solution to 5 g using neat BmimOAc. A microemulsion was formed by combining 1.00 g of the 1 wt % MCC solution and 9.00 g hexadecane (HD) in a round bottom flask. As the contents are stirring, SPAN20® is titrated into the mixture until the mixture becomes translucent and isotropic.

Once a stable microemulsion is achieved, approximately 100 μL deionized water is added to the 10 g microemulsion and stirred for one hour. Water is the primary antisolvent. Stirring allows time to help the water to diffuse through the nonpolar phase into the IL domains. After one hour, the entire emulsion is poured into 100 mL 1-butanol while stirring. The white precipitate is then collected via filtration and washed thoroughly with 1-butanol followed by deionized water. 1-butanol is primarily used in this case because it is miscible with both the IL and hexadecane, and begins extracting the IL from the polymer particles while diluting the system significantly to limit the coalescence of particles that have not yet fully formed.

Figure 14:
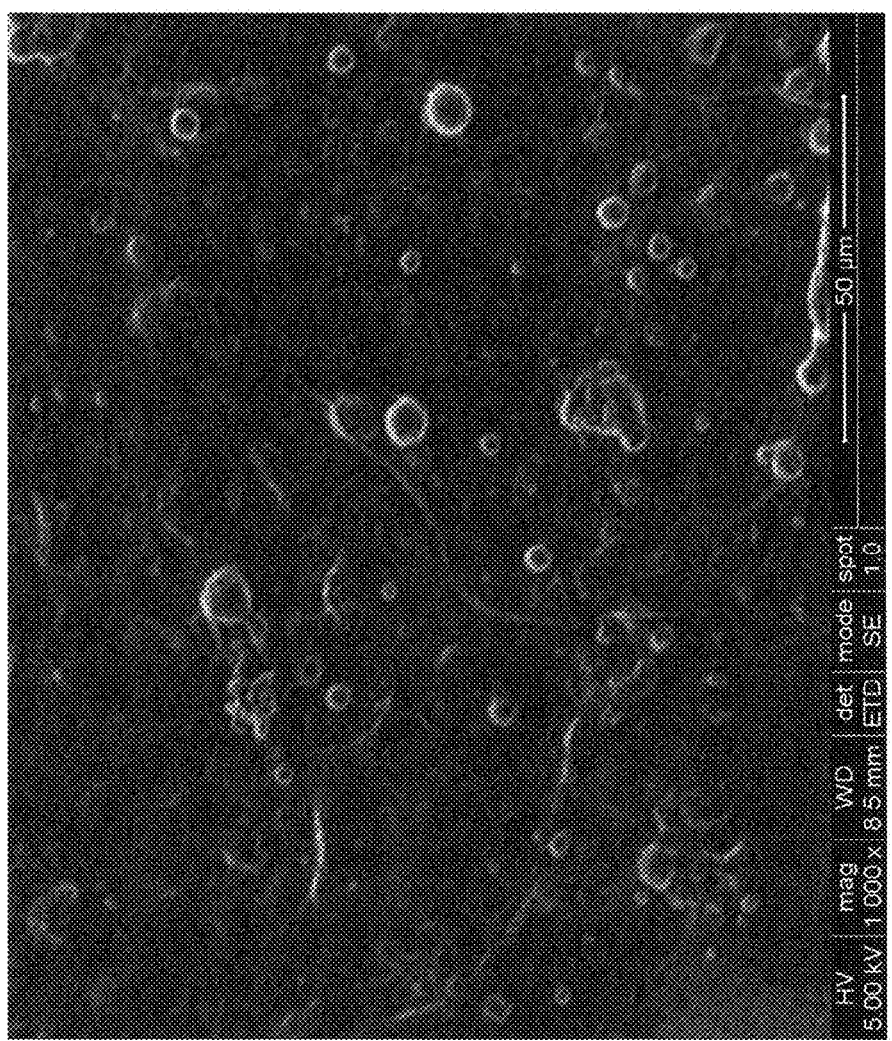
FIG. 14 depicts recovered cellulose particles with a spherical shape and a particle size range that extended below 1000 nm diameter, according to an embodiment of the invention.
Figure 15:
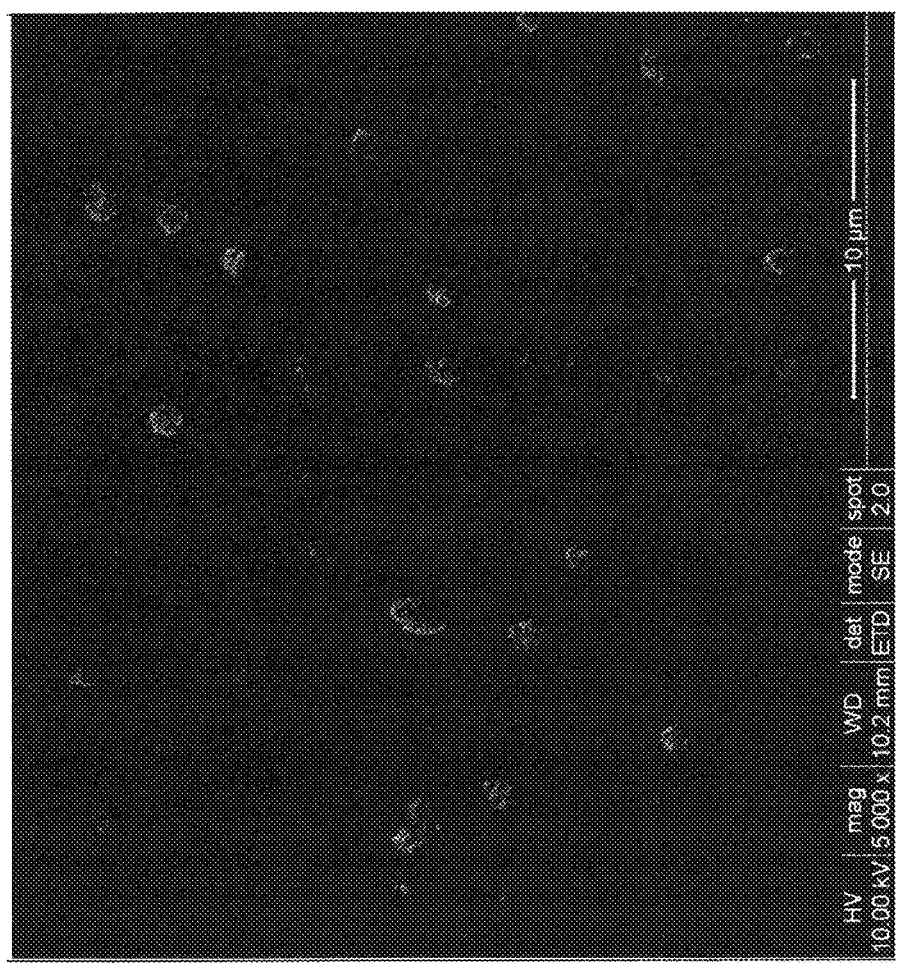
FIG. 15 depicts an example of monodisperse cellulose nanoparticles in the range of 800 nm having a mostly spherical shape with a more porous surface structure, according to an embodiment of the invention.
Figure 16:
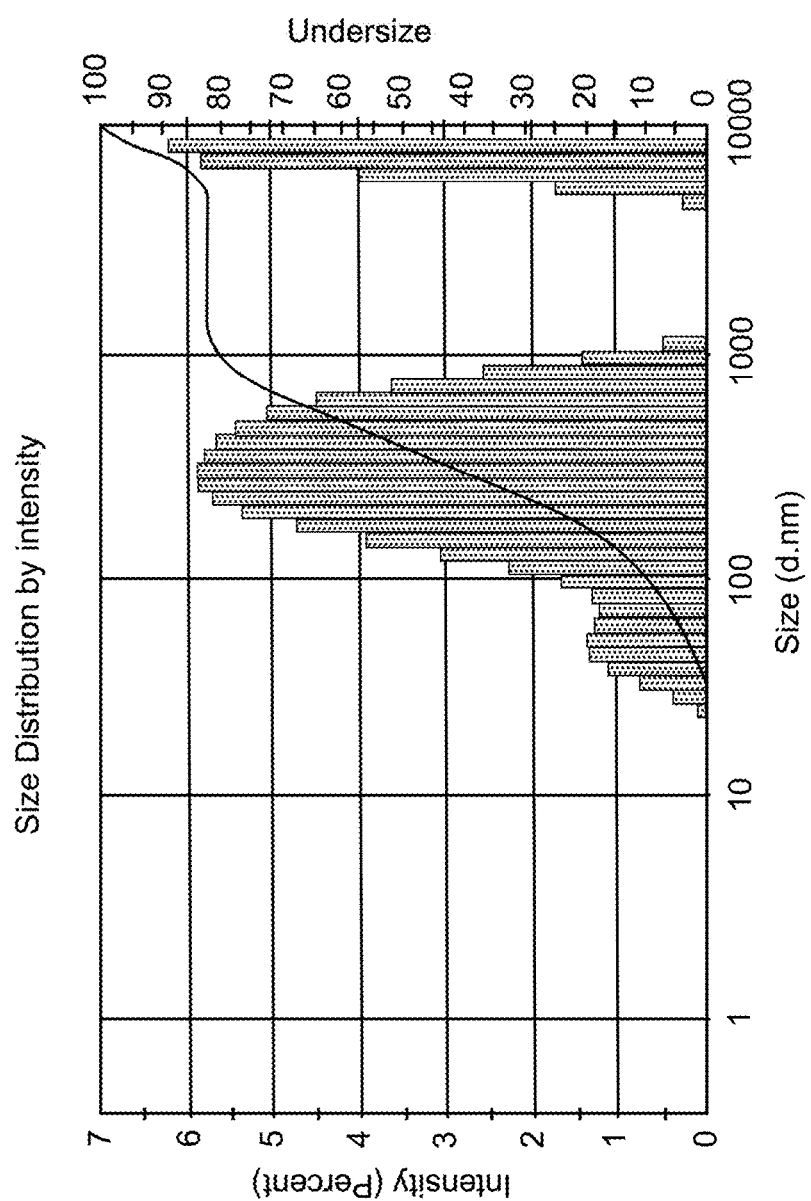
FIGS. 16-17 illustrate the drastic effect on the achievable size of the particles based on the molecular weight of the natural polymer.
Figure 17:
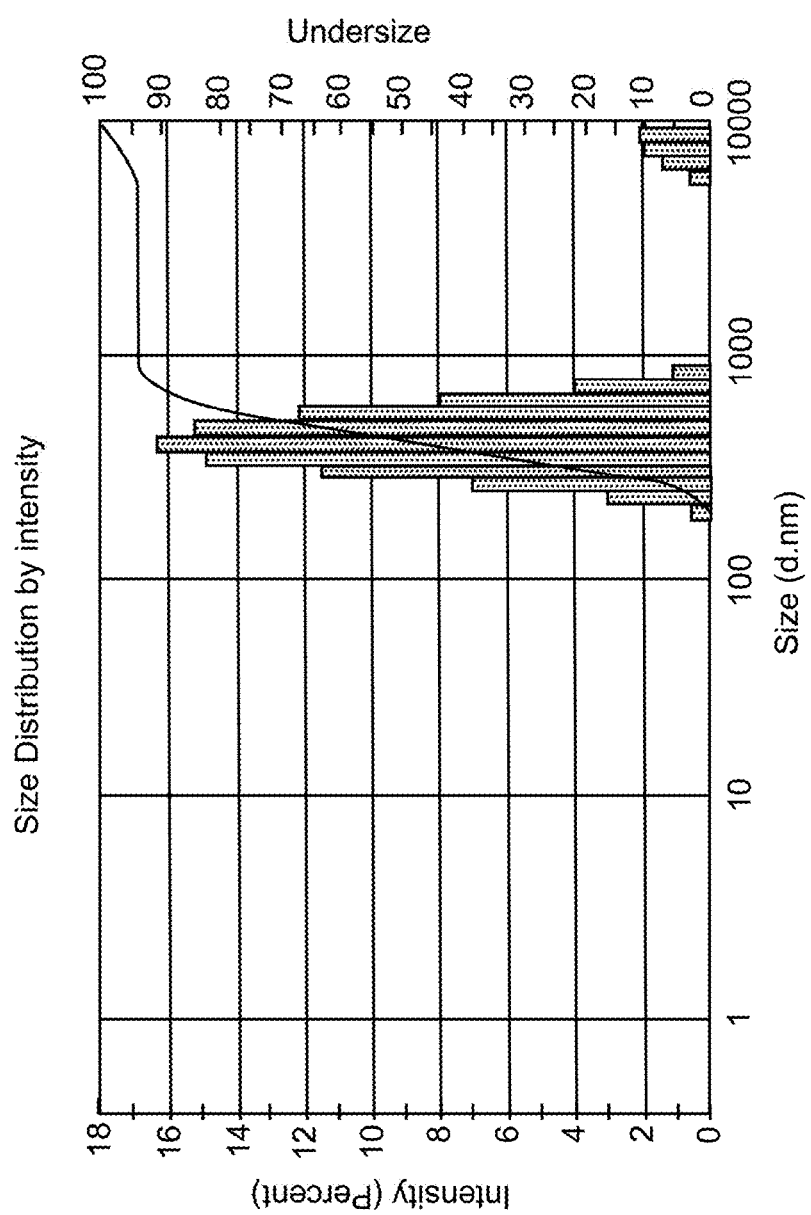

Variations of the above procedure may be used to produce cellulose nanoparticles with controlled morphology. A first emulsion produced recovered cellulose particles with a spherical shape and a particle size range that extended below 1000 nm diameter (FIG. 14). Another example (FIG. 15) produced monodisperse cellulose nanoparticles in the range of 800 nm having a mostly spherical shape with a more porous surface structure. The molecular weight of the natural polymer has a drastic effect on the achievable size of the particles, as illustrated in FIGS. 16-17. FIG. 16 illustrates the size distribution of MCC after processing. Note the broad distribution of particles from 40 nm to about 1000 nm. In addition, there is a large peak on the extreme right of the graph representing particles of about 10,000 nm. FIG. 17, in contrast, FIG. 17 illustrates MCC particles after the digestion process described above. Note the narrow peak having much greater intensity than that illustrated in FIG. 16. This indicates a much more uniform distribution of particle sizes between 100 nm and 1000 nm. In addition, the peak near 10,000 nm is almost gone, as compared with FIG. 16. Smaller molecular weight=larger range of accessible particle sizes. Mass ratios of the ternary system also affects the size and shape of the particles.

Numerous parameters of the disclosed method may be varied in order to control nanoparticle size and shape, and in order to achieve the desired size and morphology including:

1. Composition of continuous phase solvent (type and amount of ionic liquid present,—may be more than one type of ionic liquid, may be more than one type of non ionic-liquid). The continuous phase will most often be the oil/nonpolar phase. The composition of the continuous phase will determine the interfacial tension of the two domains; interfacial tension changes require adjustment of surfactant selection and ratio which ultimately dictates the size and shape of the dispersed phase domains.
2. Composition of dispersed phase solvent (type and amounts of ionic liquids and non-ionic liquids)—may be more than one type of each. The composition of the dispersed phase will usually be the ionic liquid/polymer solution, and it may include a cosolvent. The composition/ionic liquid/cosolvent choice will affect polymer solubility and the upper limit of the polymer mass available for particles will affect viscosity of the dispersed phase and the density/porosity of the recovered particle. Blends of ionic liquids may be used to tailor solubility and viscosity. The composition of the dispersed phase will determine the interfacial tension of the two domains; interfacial tension changes require adjustment of surfactant selection and ratio which ultimately dictates the size and shape of the dispersed phase domains.
3. Composition and type of surfactant(s) employed—may be more than one surfactant. Surfactant selection will affect the interfacial tension between the dispersed and continuous phases. Blending surfactants with different properties and molecular structure will be a primary factor that will determine the shape of the particles.
4. Quantity and type of natural polymer added. Quantity (mass %) will drastically change viscosity of the dispersed phase. Molecular weight of the polymer is a key factor to allow small particle sizes to be achieved. The type of polymer added will depend on the application and properties needed to meet the demands of a potential application.
5. Order of addition of ingredients and relative amounts;
6. Temperature of ingredients when added;
7. Temperature at which mixture is maintained, including programmed heating and cooling rates and set points for a predetermined time/temperature profile;
8. Composition, temperature, and pressure of atmosphere in contact with mixture—can vary over time according to a pre-determined profile;
9. Composition, amount, temperature, and pressure of anti-solvent added, along with the point in time during a pre-programmed temperature/pressure/atmospheric composition profile for addition. Anti-solvent may be added at a variable rate (e.g. over a period of 1 s to 10,000 minutes);
10. Mechanical agitation (energy input and time);
11. Rate of removal of liquids to produce solid particles; and
12. Parallel/serial processing of sub-batches to make a final batch.

Factors 5-11 above are further independent variables which will affect the ultimate size and shape of the particles produced.

Figure 18:
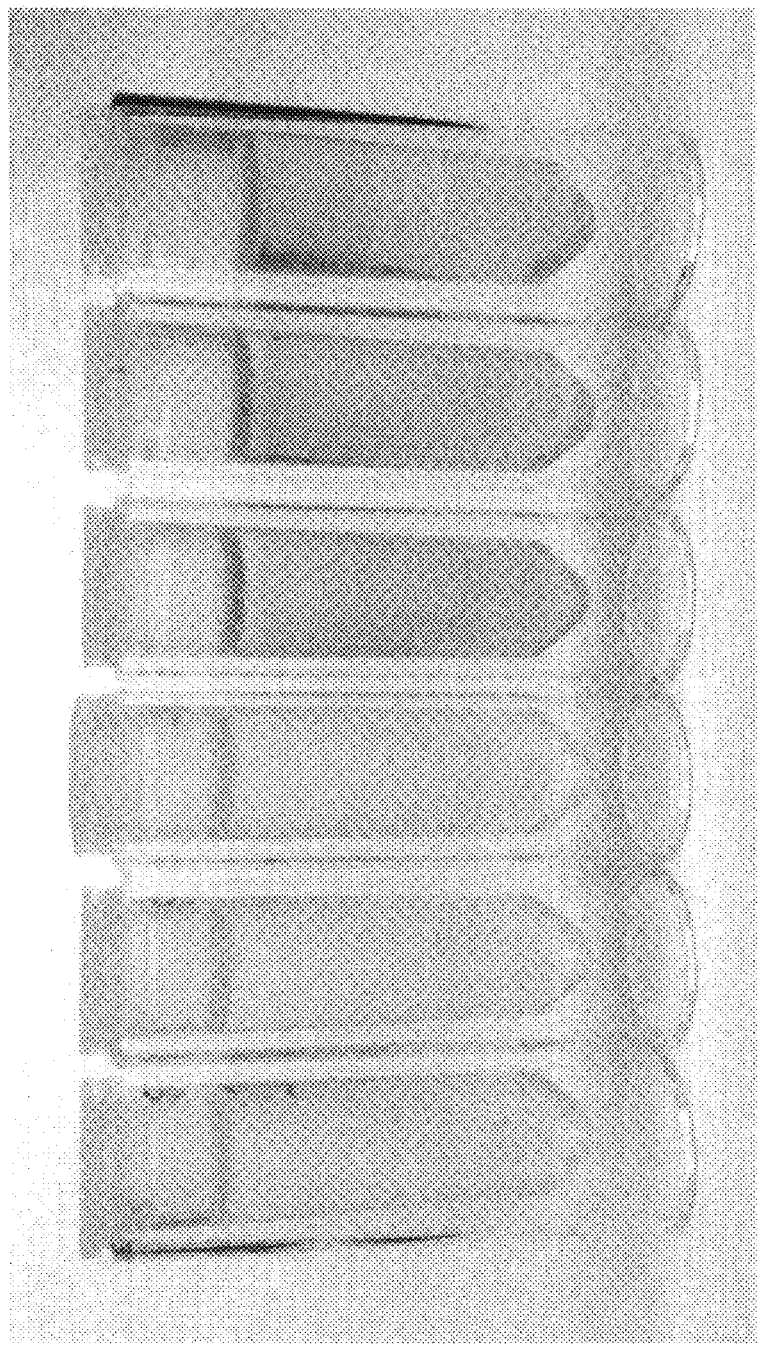
FIG. 18 depicts that visual observations and DLS may be used to identify phases, according to an embodiment of the invention.

The quasi-ternary phase diagram (FIG. 3) is constructed with BmimCl/Span 80®/Tween 20®/Sunflower oil. One may start with fixed ratios and dilute with IL to achieve the desired results. Visual observations (FIG. 18) and DLS may be used to identify phases. Dilution Line C, as depicted in FIG. 18, shows phase transition from a single isotropic phase (tubes 1-3) through a 3-phase region (tubes 4-5) to 2 phases (tube 6).

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:
1. A method of making natural polymer (nano)particles, comprising:
 a) combining a polar phase with a nonpolar phase, wherein the polar phase includes a natural polymer and an ionic liquid, wherein the natural polymer consists of at least one of keratin, fibroin, elastin, and collagen;
 b) stirring the combined polar and nonpolar phases with a surfactant to form a (micro)emulsion;
 c) adjusting the ratios among ionic liquid, surfactant and oil in the nonpolar phase to determine a particular size of natural polymer (nano)particle;
 d) adjusting the ratios among ionic liquid, surfactant and oil in the nonpolar phase to determine a particular shape of natural polymer (nano)particle;
 e) stirring an antisolvent into the (micro)emulsion;
 f) diluting the (micro)emulsion to precipitate the natural polymer (nano)particles; and
 g) recovering, washing and drying precipitated polymer (nano)particles from the diluted (micro)emulsion.

2. The method of making natural polymer (nano)particles according to claim 1, wherein the nonpolar phase further comprises at least one of hexadecane and other nonpolar solvent.

3. The method of making natural polymer (nano)particles according to claim 1, wherein the polar phase includes a natural polymer dissolved in an ionic solvent selected from the group consisting of BmimOAc, 1-butyl-3-methylimidazolium acetate; BmimCl, 1-Butyl-3-methylimidazolium chloride; and AmimCl, 1-allyl-3-methylimidazolium chloride.

4. The method of making natural polymer (nano)particles according to claim 1, wherein the surfactant is at least one of SPAN20® sorbitan monolaurate, SPAN80® sorbitan monooleate, TWEEN 20® polyoxyethylene sorbitan monolaurate, oleic acid, ionic surfactant, other nonionic surfactant, and other ethoxylate surfactant.

5. The method of making natural polymer (nano)particles according to claim 1, wherein the antisolvent is at least one of water, acetone, 1-butanol, alcohol, and protic solvent.

6. The method of making natural polymer (nano)particles according to claim 1, wherein the (micro)emulsion is diluted with at least one of 1-butanol, oil, and other mutually miscible solvent.

7. The method of making natural polymer (nano)particles according to claim 1, wherein the (micro)emulsion is diluted in excess of the volume of the (micro)emulsion in step e).

8. The method of making natural polymer (nano)particles according to claim 1, wherein the precipitated polymer (nano)particles are washed sequentially with 1-butanol and water.

9. The method of making natural polymer (nano)particles according to claim 1, wherein the precipitate comprises (nano)particles of the natural polymer.

10. Natural polymer nanoparticles made according to the method of claim 1.

* * * * *